US008665219B2

(12) United States Patent
Unger

(10) Patent No.: US 8,665,219 B2
(45) Date of Patent: Mar. 4, 2014

(54) WIRELESS ATTACHED READER SCREEN FOR CELL PHONES

(75) Inventor: Robert A. Unger, El Cajon, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 791 days.

(21) Appl. No.: 12/562,133

(22) Filed: Sep. 18, 2009

(65) Prior Publication Data

US 2011/0069073 A1    Mar. 24, 2011

(51) Int. Cl.
*G06F 3/02*    (2006.01)
(52) U.S. Cl.
USPC ............ 345/169; 345/2.3; 345/156; 345/204; 345/211; 345/619
(58) Field of Classification Search
USPC .......... 345/520, 173, 156, 169, 2.3, 204, 211, 345/619, 660, 418; 715/830, 776, 818; 725/53, 110; 709/224
See application file for complete search history.

(56) References Cited

U.S. PATENT DOCUMENTS

| | | | |
|---|---|---|---|
| 6,269,392 B1 | 7/2001 | Cotichini et al. | |
| 6,313,828 B1 * | 11/2001 | Chombo | 345/169 |
| 6,967,577 B2 | 11/2005 | Taylor et al. | |
| 7,304,635 B2 * | 12/2007 | Seet et al. | 345/156 |
| 7,545,398 B2 * | 6/2009 | Sawada | 345/211 |
| 8,185,842 B2 * | 5/2012 | Chang et al. | 715/776 |
| 2004/0140975 A1 * | 7/2004 | Saito et al. | 345/418 |
| 2004/0201569 A1 * | 10/2004 | Seet et al. | 345/156 |
| 2005/0184975 A1 * | 8/2005 | Sawada | 345/204 |
| 2006/0103629 A1 * | 5/2006 | Seet et al. | 345/156 |
| 2007/0010289 A1 | 1/2007 | Mezue | |
| 2007/0168883 A1 * | 7/2007 | Sugimoto | 715/818 |
| 2008/0259043 A1 * | 10/2008 | Buil et al. | 345/173 |
| 2008/0307463 A1 * | 12/2008 | Beetcher et al. | 725/53 |
| 2009/0267909 A1 * | 10/2009 | Chen et al. | 345/173 |
| 2010/0064332 A1 * | 3/2010 | Krikorian et al. | 725/110 |
| 2010/0070925 A1 * | 3/2010 | Einaudi et al. | 715/830 |
| 2012/0117221 A1 * | 5/2012 | Katpelly et al. | 709/224 |

FOREIGN PATENT DOCUMENTS

| | | |
|---|---|---|
| EP | 1308825 | 5/2003 |
| JP | 2003209604 | 7/2003 |

* cited by examiner

*Primary Examiner* — Thuy Pardo
(74) *Attorney, Agent, or Firm* — Fitch, Even, Tabin & Flannery LLP

(57) ABSTRACT

A display device is provided comprising a housing, a communication means within the housing configured to receive content from a local content source device external to the housing and to transmit messages to the local content source device, wherein the content comprises a static screen image, a storage means configured to store the content having been received from the content source device, wherein the storage means stores no more than a single static screen image and a display configured to display the content. A method for use with the display device is further provided.

21 Claims, 10 Drawing Sheets

WIRELESS ATTACHED READER SCREEN FOR CELL PHONES

This application claims the benefit of U.S. Provisional Application No. 61/153,565, filed Feb. 18, 2009, which is incorporated in its entirety herein by reference.

BACKGROUND OF THE INVENTION

1. Field of the Invention

The present invention relates generally to display devices, and more specifically to a peripheral display device for use with existing electronic devices such as cell phones.

2. Discussion of the Related Art

Electronic readers have gained tremendous popularity in the last few years. Such devices provide the user with a memory for storing content and further provide a screen for displaying the content to the users. Content is downloaded from the internet or other locations to the memory of the device and displayed to the user. These devices are often costly. In addition, the device contains all of the content owned by the user and therefore the user is at the risk of losing all of their content if the device is lost or stolen.

Cell phones also provide applications for reading content for the user. Although the phones have all of the intelligence necessary for providing the user with the same experience as is provided by electronic readers, these devices often have screens of limited size and therefore it is often difficult for the user to view the content.

SUMMARY OF THE INVENTION

Several embodiments of the invention advantageously address the needs above as well as other needs by providing a display device comprising a housing, a communication means within the housing configured to receive content from a local content source device external to the housing and to transmit messages to the local content source device, wherein the content comprises a static screen image, a storage means configured to store the content having been received from the local content source device, wherein the storage means stores no more than a single static screen image and a display configured to display the content.

In another embodiment, the invention can be characterized as a method for use with a display device comprising establishing a communication channel with a local content source device external to the display device, wherein the communication channel enables the display device to receive content corresponding to a single static screen image and transmit requests to the local content source device, receiving a first content at the display device from the local content source device, wherein the first content corresponds to a single static screen image, displaying the content at the display device, receiving a second content at the display device, wherein the second content corresponds to a single static image, displaying the second content and removing the first content from the display device in response to displaying the second content.

In a further embodiment, the invention may be characterized as a method for use with a display device comprising establishing a communication channel with a local content source device external to the display device, receiving a first content from the local content source device, wherein the first content corresponds to a single static screen image, displaying the first content at the display device, receiving a user request, displaying a second content corresponding to the user request, wherein the second content corresponds to a single static image and removing the first content from the display device in response to displaying the second content.

Additional embodiments of the invention can be characterized as a local content source device, comprising a housing, communication means within the housing configured to establish a communication channel with a local display device external to the housing, a processor and a computer readable medium coupled to the processor, the computer readable medium storing application machine code to be executed by the processor, wherein the processor is adapted to execute the application machine code to establish the communication channel with the local display device wherein the communication channel is capable of transmitting content to the local display device, and wherein each transmittal contains content corresponding to a single static screen image, transmit a first content to the local display device wherein the first content corresponds to a single static screen image, receive a request and transmit a second content corresponding to a single static screen image to the local display device in response to the request.

Others embodiments of the invention can be characterized as a method comprising establishing a communication channel from a local content source device with a local display device, wherein the communication channel enables transmitting content to the local display device, and wherein each transmittal contains content corresponding to a single static image, transmitting a first content to the local display device, wherein the first content comprises a single static screen image, receiving a request and transmitting a second content corresponding to a single static screen image to the local display device in response to the request.

BRIEF DESCRIPTION OF THE DRAWINGS

The above and other aspects, features and advantages of several embodiments of the present invention will be more apparent from the following more particular description thereof, presented in conjunction with the following drawings.

Figure 1A:
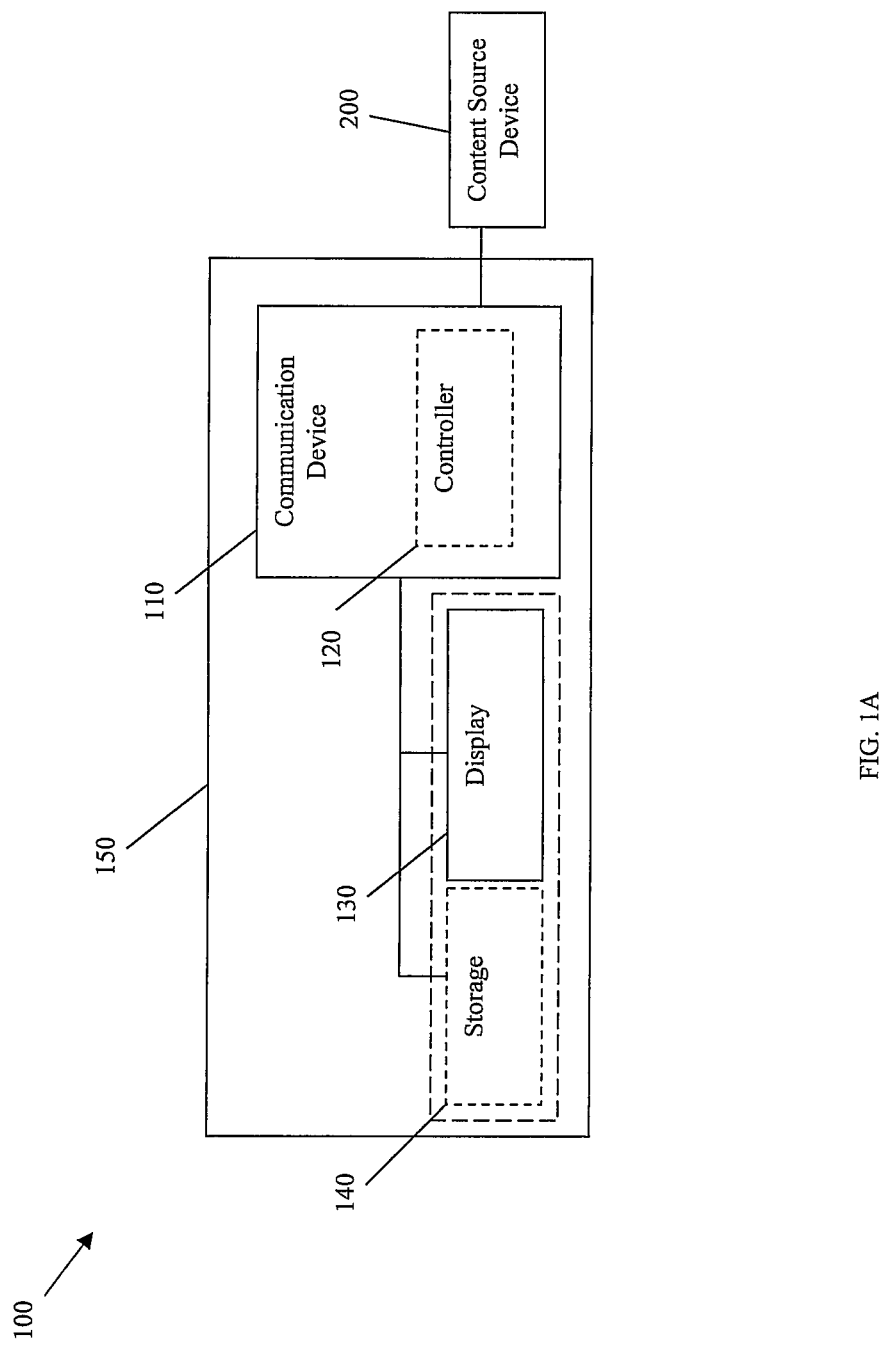
FIG. 1A illustrates an exemplary block diagram of a display device, according to one embodiment the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

As mentioned above, electronic readers have gained tremendous popularity among users in the past few years. Although these devices provide the reader with an experience similar to reading an actual book, they are very costly and the user bears the risk of losing all of their content if the device is lost or stolen. The electronic readers store all of the content owned by the user and therefore, cannot be shared among users and are personal to the single user. Also if the device is lost or misplaced the user bears the risk of having all of their content viewed by others. Additionally, because the electronic reader device is a separate device from the user's cell phone or other primary electronic devices, the user's content cannot be maintained in one central location and is dispersed into one or more separate devices.

Cell phones also provide the user with the capability to retrieve and view content such as books, magazines, newspapers, etc. However, often the user is limited to the small display screen of the phone for viewing the content and therefore is not able to have an experience that is similar to reading a book.

Embodiments of the present invention provide a peripheral display device for use with electronic devices such as a cell phone which provides the user with the capability of viewing content on a large display and further reduces the risk of losing all of the content, and provides the user with a centralized storage location for all content.

For example, a display device is provided that has a communication means for establishing a communication channel with a local content source device such as a cell phone, PDA, or other device, and receives content from the local content source device. The display device then displays the content on the display screen of the device. According to some embodiments, the display device only receives a content corresponding to a single image at any given time and after displaying the content, the content is removed from the display device. As such, the display device does not store content and reduces the risk of the user losing their content if the device is lost or misplaced. Further, the display device, removes all of the content at the display device upon being inactive for a predetermined period of time, and so the user does not risk having their content available to unauthorized readers. Instead, the user's content is centrally located at a local content source device, or remote storage location and provided to the device for display.

Furthermore, because the device stores no personal information or content, the device can be shared among users without any risk of personal, or confidential information being displayed to an unintended user.

In the following discussion, embodiments of the present invention are described with respect to a display screen in communication with a cell phone device. However, it should be understood that the device can be used with any external electronic device or system, capable of establishing a communication channel with the display device, and capable of providing content to the display device.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, hardware structures, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1A illustrates an exemplary block diagram of a display device, according to the present invention. The display device comprises a communication device 110 and a display 130. In one embodiment, the communication device comprises a controller 120. In some embodiments, the display device 100 further comprises a storage 140. In some embodiments, storage 140 may be integrated with the display 130. As illustrated in FIG. 1A, these components are housed within a housing 150 of the display device 100.

In some embodiments, display device 100 is releasably coupled to a local content source device 200 external to the housing 150, such as a cell phone, PDA, etc., through the communication device 110. Display device 100 may communicate with the local content source device 200 through a wired or wireless connection. For example, in some embodiments, the communication is a wireless connection, such as a Bluetooth connection, Internet connection, LAN, etc. In other embodiments, the communication may be through a wired connection. In one embodiment, a retractable cord may facilitate the wired connection. In another embodiment, the wired connection may be a dock on the back of the display device for receiving the local content source device. In some embodiments, the display device will be capable of communicating with the local content source device through both wireless and wired connections. That is, the user will be capable of using the display device wirelessly, but will also be provided with means for establishing a wired connection with the local content source device where wireless connection may not be available, such as in an airplane.

In some embodiments, the display 130 is an e-ink display and displays content using e-ink technology. In other embodiments, the display 130 may be implemented using OLED technology. The display 130 may display content in a monochromatic manner in some embodiments. In other embodiments, display 130 may facilitate a full color display of content. The display device 100 may be able to display static content such as photos, images, and books, as well as dynamic content such as video. In some embodiments, storage 140 is a temporary buffer. In some embodiments, the storage 140 may be integrated into display 130. For example, the storage 140 may be the e-ink memory of the display where the display 130 is an e-ink display.

In some embodiments, the display device has limited storage capacity. That is, in one or more embodiments, the display device only contains content corresponding to a single static frame being displayed at the display 130. In another embodiment, the display device may store content corresponding to the image being displayed, as well as a second static image buffered as the first content is being displayed. In another embodiment, the display device only has the capability to receive and display content and to transmit requests to the local content source device, and does not include intelligence for performing any other tasks. In another embodiment, the display device may have limited capability of performing some tasks but more complex tasks are performed at the local content source device.

In one embodiment, the communication device 110 only receives content corresponding to a single image at any given time. Furthermore, the storage 140 may only store content corresponding to a single static image, or single frame. In one embodiment, the storage is a buffer, and only temporarily stores the content while it is being displayed at the display 130. In another embodiment, the storage 140 is the e-ink memory of the display 130 and therefore, the content is only present at the storage 140 while it is displayed at the display 130 and as upon new content being displayed on the display the content of the storage is overwritten with the new content.

In some embodiments, the device 100 may further comprise a power source (NOT SHOWN). In some embodiments, the device 100 may receive power through a battery at the device. In other embodiments, the device may be rechargeable and may comprise a power input socket for receiving a power cord. In some embodiments, the device may be connected to the local content source device through a wired connection, such as for example, a retractable cord or dock, and may be charged and/or receive operating power through its connection to the local content source device 200. In other embodiments, the device may be recharged using a separate connection from the connection that is used to communicate with the local content source device 200.

Figure 1B:
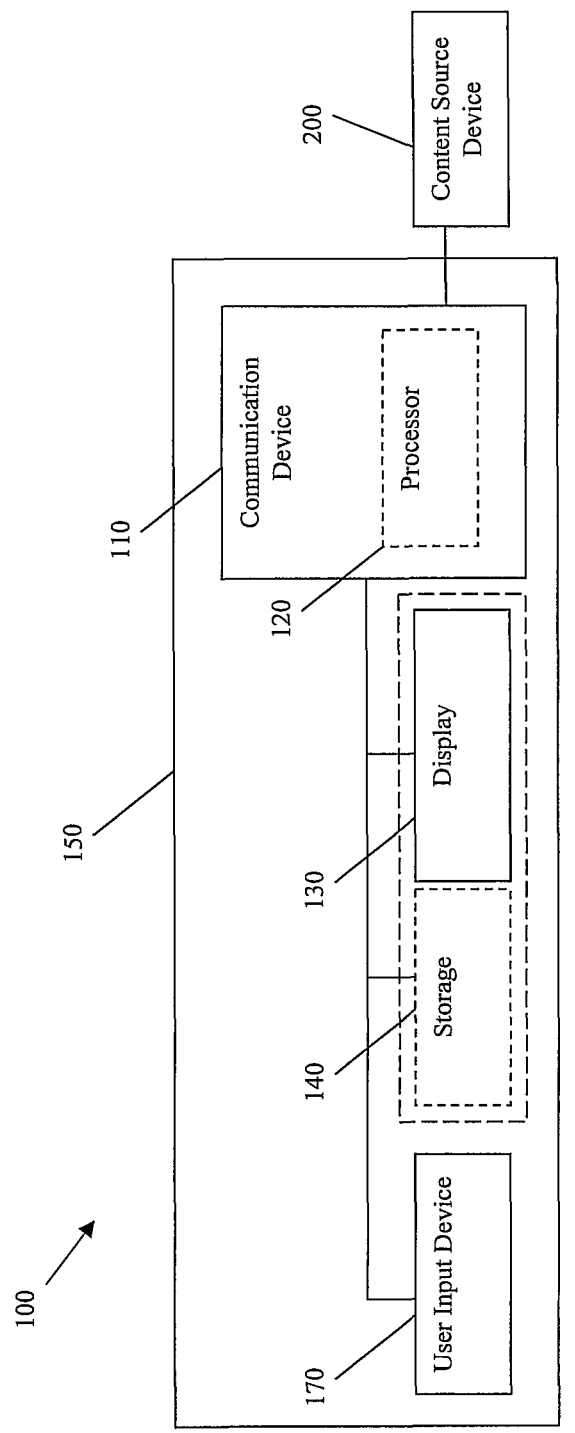
FIG. 1B illustrates an exemplary block diagram of an alternative embodiment of the display device, according to one embodiment of the present invention.

FIG. 1B illustrates a block diagram of an alternative embodiment of the display device, according to one embodiment of the present invention. Similar to FIG. 1A, the display device comprises a communication device 110 and a display 130. The communication device in some embodiments comprises a controller 120. Furthermore, similar to FIG. 1A, display device 100 may further comprise a storage 140. In this embodiment, the display device 100 further comprises an input device 170. These components are housed within the housing 150 of the display device.

The input device 170 may comprise one or more buttons enabling the user to enter requests to view new content or modify existing content currently being displayed. For example, in one embodiment, the user may be provided with buttons to move through content, e.g. pages of a book, magazines, pictures, frames in a video, etc., and may further be provided with capability to bookmark, make notes, comment or take other actions with regard to the image being displayed. In some embodiments, the input device may further comprise an on/off button. In other embodiments, the device may not be equipped with an on/off button and may turn on when the user depresses any button on the device, and may further turn off when the device has been inactive for a certain period of time. In another embodiment, the display device, may further comprise a detection means for determining that the device has been inactive for a certain period of time and will turn off the device. In one or more embodiments, upon being turned off, or after a certain time period after being turned off, all of the content is removed from the display device 100. In one embodiment, the input device is located on the surface of housing 150.

Figure 1C:
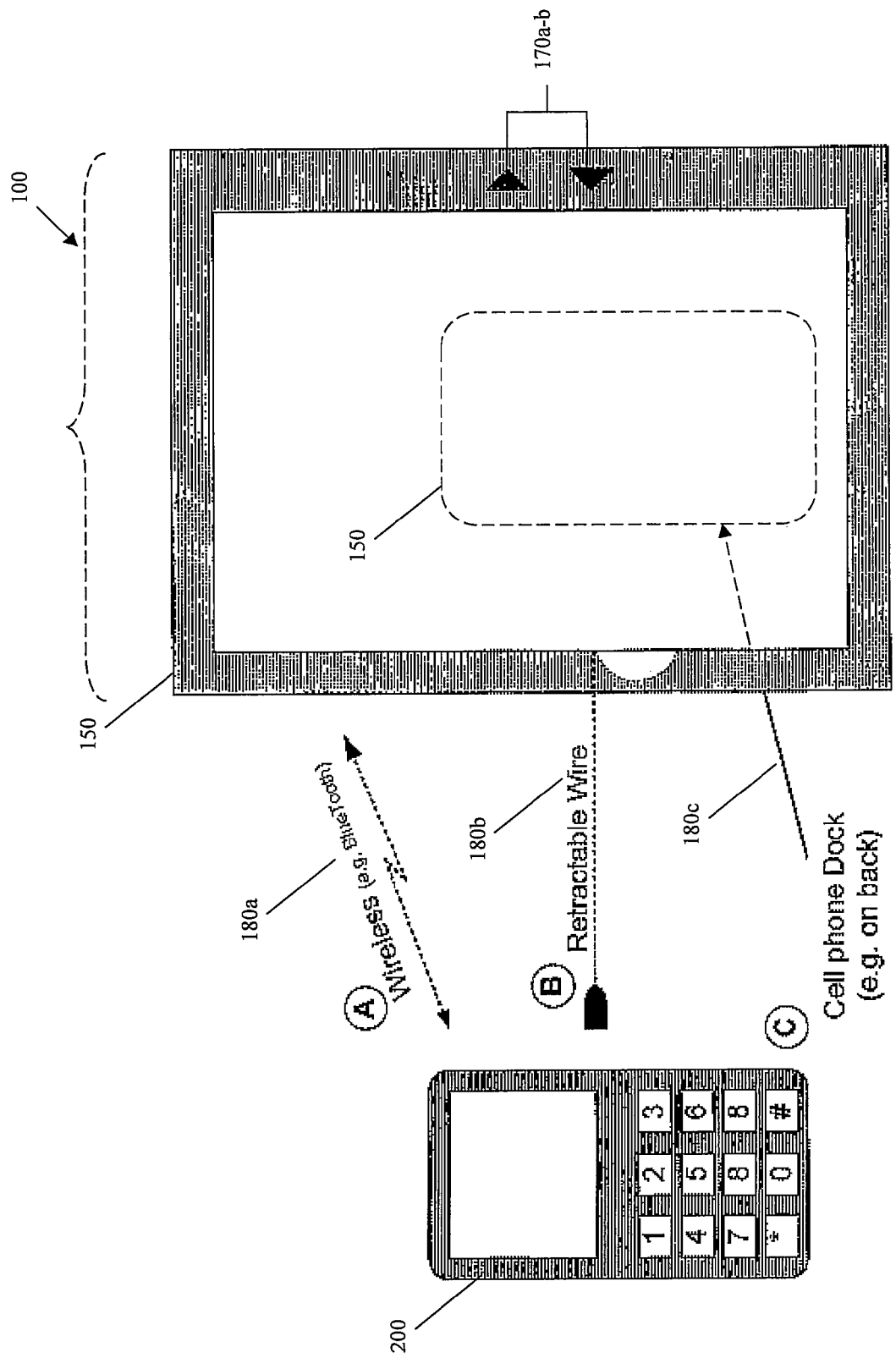
FIG. 1C illustrates an exemplary embodiment of the display device 100, according to several embodiments of the present invention.

Referring next to FIG. 1C, an exemplary embodiment of the display device 100 is illustrated according to several embodiments of the present invention. In some embodiments, the functional structure of the e-reader device may be similar to that illustrated in FIGS. 1A and 1B.

The e-reader device 100 comprises a housing 150, a display 130, and user input buttons 170*a* and 170*b*. Furthermore, the e-reader device 100 further comprises means for establishing a communication channel with a local content source device 200 such as a cell phone. In some embodiments, the e-reader device 100 may be configured to a communication channel with the local content source device 200 through a wireless communication 180*a*. In one embodiment for example, the wireless communication may be a Bluetooth communication, Internet, LAN, Ethernet or other such connections. The local content source device 200 is illustrated as a cell phone in this figure. However, it should be noted, that the local content source device 200 may be a variety of electronic devices having memory and/or intelligence to retrieve or store content that can be sent to the display device through the communication channel 180*a-c*.

The local content source device 200 may comprise for example a separate display and user input means for receiving user request. In one embodiment, the local content source device 200 further comprises a memory for storing content that is then sent to the display device. In another embodiment, the local content source device 200 comprises a communication device for retrieving content from a remote location such as the internet, before it is sent to the display device for display.

Figure 2:
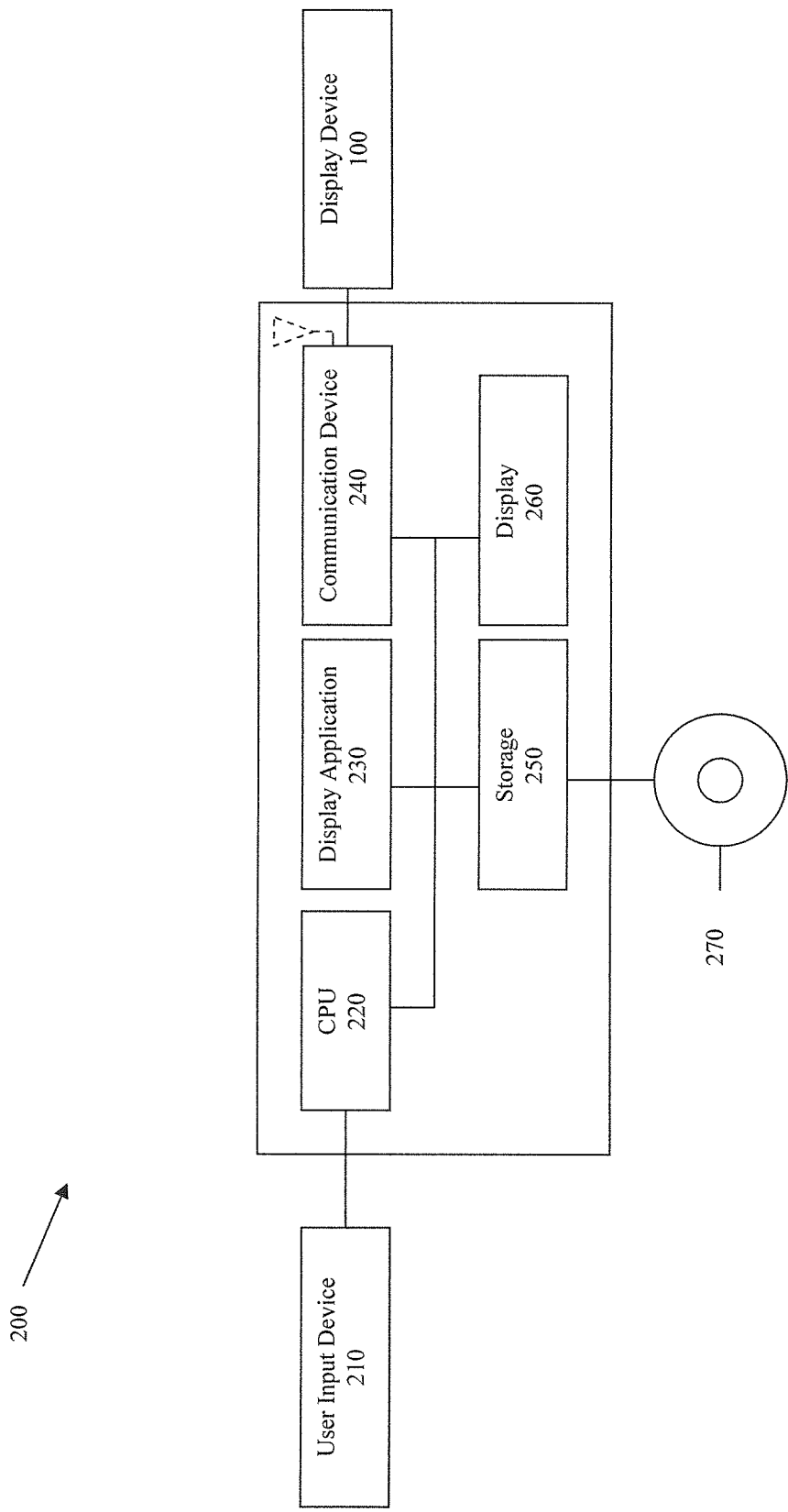
FIG. 2 illustrates a block diagram of the system structure of the local content source device 200, according to one embodiment of the present invention.

FIG. 2 illustrates a block diagram of the system structure of the local content source device 200 according to one embodiment of the present invention. In one embodiment, the local content source device 200 may comprise a display 260 such as a display and a user input device 210, a Central Processing Unit (CPU) 220, a display application 230, a communication device 240, and a storage unit 250.

In addition to the CPU 220, the local content source device 200 may also comprise a Graphical Processing Unit (GPU) (not shown). The CPU and/or GPU may be used to execute or assist in executing the steps of the methods and techniques described herein, and various content. In one embodiment, the Display Application 230 contains computer executable machine code to cause the local content source device to perform the steps and methods described below with respect to several embodiments of the invention.

The user input device 210 may comprise any user input device such a keyboard, mouse, game controller, etc. According to one embodiment, storage unit 250 may comprise one or both a Random Access Memory (RAM) and Mass storage. The mass storage may comprise any type of computer readable storage or recording medium or media. The computer readable storage or recording medium or media may be fixed in the storage unit 250, or the storage unit 250 may optionally include removable storage media 270, such as a digital video disk (DVD), Blu-ray disc, compact disk (CD), USB storage device, floppy disk, memory card or other media. By way of example, the storage unit 250 may comprise a disk drive, a hard disk drive, flash memory device, USB storage device, Blu-ray disc drive, DVD drive, CD drive, floppy disk drive, etc.

Thus, removable storage media 270 may optionally be used with the storage unit 250, which may be used for storing code that implements the methods and techniques described herein. Any of such storage devices may serve as a tangible computer storage medium for embodying a computer program for causing a console, system, computer, or other processor based system to execute or perform the steps of any of the methods, code, and/or techniques described herein. Furthermore, any of the storage devices, such as the RAM or mass storage with storage unit 250 or removable storage media 270, may be used for storing any needed database(s) or for storing content that is provided to the display device.

Communication device 240 may comprise several devices and connectors enabling the local content source device 200 to establish a communication channel with the display device, as well as with other devices, remote databases, etc. For example, the communication device 240 may comprise means for establishing a wireless and/or wired communication channel with other devices and remote locations such as the display device, other devices and the internet. For example, in one embodiment, the communication device 240 may comprise a Bluetooth adapter for allowing the local content source device 200 to establish a Bluetooth connection with the display device 100. The communication device 240 may further comprise means for establishing a communication channel with the display device 100 or other devices or remote databases, the internet, etc., through an internet, LAN, Ethernet or other wireless methods of communication. In one embodiment, the communication device 240 may additionally or alternatively comprise means for establishing a wired connection with local content source devices. For example, the communication device 240 may comprise connectors for connecting to display device or other devices through a cord, pin connection, and/or dock.

In another embodiment, the local content source device 200 additionally comprises a global positioning system. In one embodiment, for example, the device 200 is capable of determining the position of the display device 100 and to store the location for later retrieval. For example, in one embodiment, the local content source device 200 will store the location of the device upon establishing communication with the display device 100, and will store the position. The user of the local content source device and/or display device, will then be able to determine the last location at which he/she used the display device 100.

Figure 3:
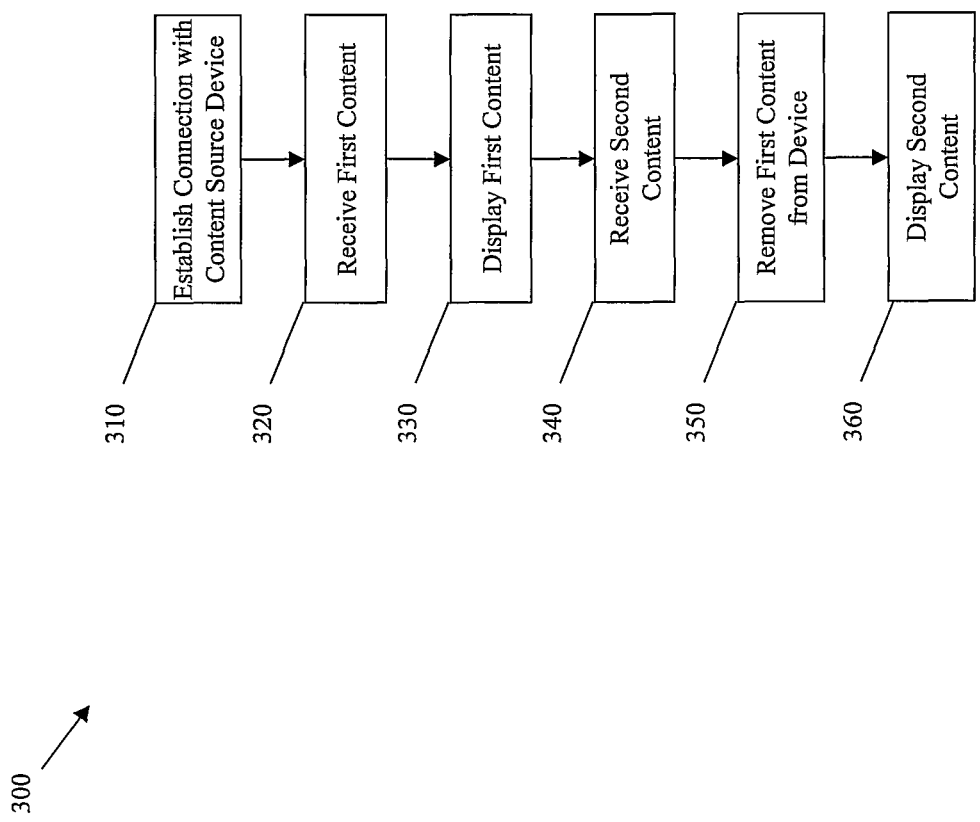
FIG. 3 illustrates an exemplary process 300 of displaying content at the display device 100, according to one embodiment of the present invention.

Referring next to FIG. 3, an exemplary process 300 of displaying content at the display device 100 is illustrated, according to one embodiment of the present invention. The process begins in step 310 where the display device 100 establishes a communication channel with a local content source device, such as for example local content source device 200. In one embodiment, the connection is established upon the display device being turned on. In such embodiment, for example, once the user enters the proper user input, through the user input means provided at the display device, the device is turned on and attempts to establish a connection with the local content source device. In another embodiment, upon being turned on the user is asked to enter an input, such as a pin, the identification information for the local content source device it wishes to connect with, etc., or to verify the local content source device, before the connection is established. In yet another embodiment, the connection in step 310 is established at the local content source device where the user enters a request for establishing a connection between the display device and the local content source device. In such embodiments, similar information such as identification information, pin, etc. may be required before a connection is established. In some embodiments, as a result of establishing a connection in step 310, a communication channel may be established between the display device and the local content source device. In one embodiment, the device may be turned on in response to the request to establish the communication, or in response to the communication being established.

In one embodiment, the communication channel enables a two-way communication between the local content source device 200 and the display device 100, such that the display device is able to send and/or receive messages from the local content source device through the communication device.

Next in step 320, the display device receives a first content from the local content source device. In one embodiment, before receiving the content, the display device 100 sends a request to the local content source device via the communication channel and the local content source device forwards the first content to the display device. In another embodiment, upon establishing the communication the local content source device automatically sends the content to the display device. In one embodiment, the user may enter a request before the first content is forwarded to the display device. In one embodiment, the first content corresponds to a single frame. That is, in some embodiments, the display device only receives as much content as it can display.

Upon receiving the first content, in step 330 the displays device display the first content. In one embodiment, the content is displayed using e-ink technology. In another embodiment, the content is displayed using OLED technology.

While displaying the first content, in step 340 the display device receives a second content. The second content may comprise new content, or modified content corresponding to modifications made to content currently being displayed, i.e. first content. For example, in one embodiment, the second content may comprise a next page in a book, the same page of the book displaying notes made by the user, the same page having a bookmark image or representation, etc.

In one embodiment, the display device receives the second content in response to transmitting a request to the local content source device. In one embodiment, for example, the display device receives a user request. In one embodiment, the user request in entered using the user input means at the display device. For example, in one embodiment, the user may enter the request using one or more buttons placed on the housing of the display device. In another embodiment, the display device may be equipped with touch screen technology, and the user may enter a request by using the touch screen.

In another embodiment, the user enters a request at the local content source device, and the local content source device transmits new content to the display device in response to the user request. In one embodiment, for example, the user enters a request using the user input means at the local content source device 200. In one or more embodiments, in response to the request the local content source device sends new content to the display device.

In one embodiment, the user request is for new content. For example, in one embodiment, where the content comprises a book, the user may enter a request to move to the next page of the book. In another embodiment, the user request may comprise a request to modify content, or mark content. For example, in one embodiment, the user may request to bookmark the content being displayed at the display device for later retrieval, or for future reference. In another embodiment, the user may be able to enter notes at the display device and/or the local content source device about the image or content. In yet another embodiment, the user may request to modify the image, for example zoom in or zoom out, crop the image, etc.

Next, in step 350, in response to receiving the second content, the display device removes the first content from the display device, and in step 360, the device displays the second content. In some embodiments, step 360 occurs before step 350. In other embodiments, step 350 and 360 may occur simultaneously. In some embodiments, the first content is removed as a result of displaying the second content. In some embodiments, the second content is written over the first content, therefore, essentially removing the first content from the device.

Figure 4:
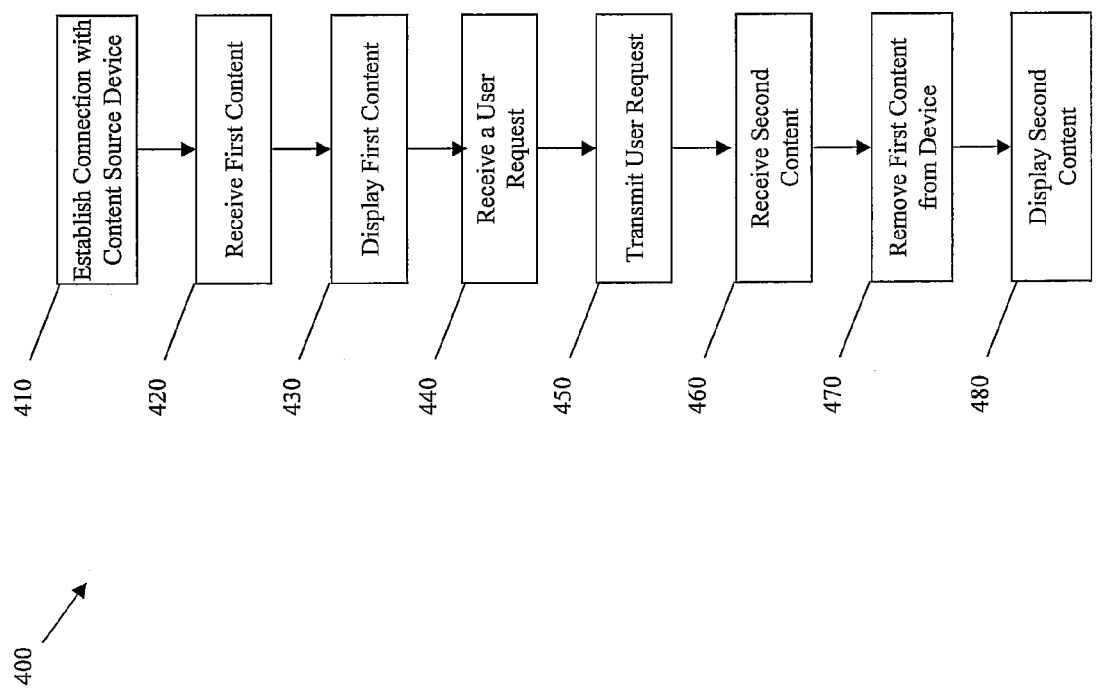
FIG. 4 illustrates another exemplary process 400 of displaying content at the display device 100, according to one embodiment of the present invention.

FIG. 4 illustrates another exemplary process 400 of displaying content at the display device 100, according to one embodiment of the present invention. The process begins in step 410 where the display device 100 establishes a connection with a local content source device, such as for example local content source device 200. In one embodiment, the connection is established upon the display device being turned on. In such embodiment, for example, once the user enters the proper user input through the user input means provided at the display device, the device is turned on and attempts to establish a connection with the local content source device. In another embodiment, upon being turned on the user is asked to enter a command, such as a pin, the identification information for the local content source device it wishes to connect with, etc., or to verify the local content source device, before the connection is established. In yet another embodiment, the connection in step 410 is established at the local content source device where the user enters a request for establishing a connection between the display device and the local content source device. In such embodiments, similar information such as identification information, pin, etc. may be required before a connection is established. In some embodiments, as a result of establishing a connection in step 410, a communication channel may be established between the display device and the local content source device.

In one embodiment, the communication channel enables a two-way communication between the local content source device 200 and the display device 100, such that the display device is able to send and receive messages from the local content source device through the communication device.

Next in step 420, the display device receives a first content from the local content source device. In one embodiment, before receiving the first content, the display device 100 sends a request to the local content source device via the communication channel and the local content source device forwards the first content to the display device. In another embodiment, upon establishing the communication the local content source device automatically sends the content to the display device. In one embodiment, the user may enter a request before the first content is forwarded to the display device. In one embodiment, the first content corresponds to a single frame. That is, in some embodiments, the display device only receives as much content as it can display.

Upon receiving the first content, in step 430 the display device displays the first content. In one embodiment, the content is displayed using e-ink technology. In another embodiment, the content is displayed using OLED technology.

While displaying the first content, in step 440 the display device receives a user request. In one embodiment, the user request in entered using the user input means at the display device. For example, in one embodiment, the user may enter the request using one or more buttons placed on the housing of the display device. In another embodiment, the display device may be equipped with touch screen technology, and the user may enter a request by using the touch screen. In one embodiment, the user request is for new content. For example, in one embodiment, where the content comprises a book, the user may enter a request to move to the next page of the book. In another embodiment, the user request may comprise a request to modify content, or mark content. For example, in one embodiment, the user may request to bookmark the content being displayed at the display device for later retrieval, or for future reference. In another embodiment, the user may be able to enter notes at the device about the image or content. In yet another embodiment, the user may request to modify the image, for example zoom in or zoom out, crop the image, etc.

Upon receiving the user request, in step 450 the display device transmits the user request to the local content source device. In some embodiments, the display device transmits the message through the communication device 110. In one embodiment, the display device does not have any intelligence, and the signal received from the user input means is directly forwarded to the local content source device. In such embodiments, the local content source device is equipped with the necessary intelligence to analyze the signal to determine what the user request comprises. In another embodiment, the display device may first determine what the request is, and forward a request message corresponding to the type of request received from the user.

Next in step 460, the display device receives a second content corresponding to the user request. The second content may comprise new content, or modified content. For example, in one embodiment, the second content may comprise a next page in a book, the same page of the book displaying the notes made by the user, the same page having a bookmark image or representation, etc.

In step 470, in response to receiving the second content, the display device removes the first content from the device, and in step 480, the device displays the second content. In some embodiments, steps 470 and 480 are performed simultaneously. In other embodiments, step 480 may occur before step 470. In some embodiments, the first content is removed as a result of displaying the second content. In some embodiments, the display 130 at the display device 100 is an e-ink display and the second content is written over the first content, therefore, essentially removing the first content from the device.

In several embodiments, as described above, the display device 100 only stores a single static image at any given time. That is, in some embodiments, the only data available at the display device 100 is the image being displayed. Yet, in an alternative embodiment, the display device may comprise an extra storage, e.g. buffer, in addition to the storage 140. In such embodiment, the extra buffer may be capable of storing a buffered content. In one embodiment, the buffered content corresponds to content that the system determines as the most likely next content request by the user. For example, in one embodiment where the user is reading a book on the display device, it is most likely that after finishing the current page being displayed at the display device, the user will request to view the next page of content. In this case, the extra buffer will store the content corresponding to the next page of the book and will provide the content to the display upon receiving a user request.

Figure 5:
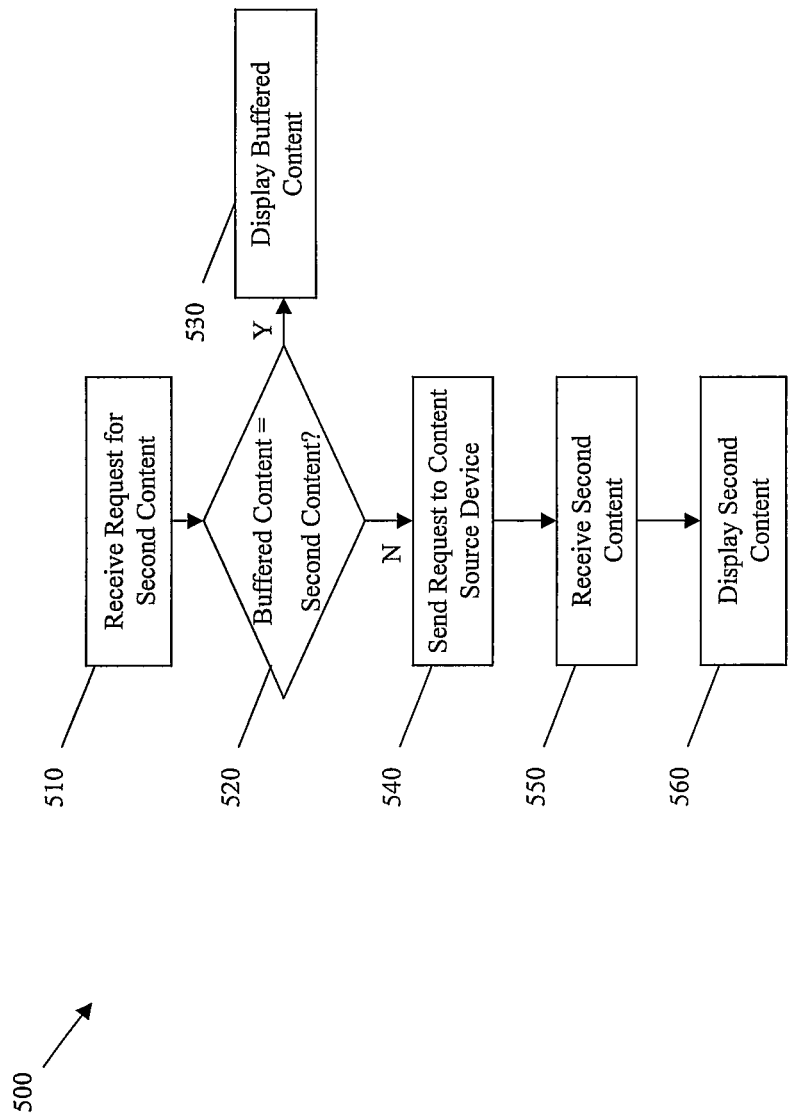
FIG. 5 illustrates an exemplary process 500 of displaying content in accordance with this embodiment of the invention.

FIG. 5 illustrates an exemplary process 500 of displaying content in accordance with this embodiment of the invention. While displaying a first content in step 510 the display device receives a request for second content. In step 520, the display device determines whether the second content is the same content as the buffered content stored in the second storage, or buffer. If it is determined that the second content is the same as the buffered content, then the buffer content is displayed in step 530. In one embodiment, in response to displaying the buffered content, the first content is removed from the device. In another embodiment, the buffered content is written over the new content and therefore essentially removes the first content from the device. If on the other hand, it is determined that the buffered content is not the same as the second content, the request is transmitted to the local content source device.

In one embodiment, upon determining that the second content is not the same as the buffered content, the buffered content may be removed from the device. In yet another embodiment, the buffered content may be only removed if the request for the second content is a request for new content, and will be retained if the request is for editing or modifying content. In yet another embodiment, the buffered content is retained if it is determined that the buffered content remains the mostly likely content to be requested next after the second content is displayed, and will be replaced with another content if it is determined that it is not the most likely next content. In some embodiments, this determination is made by the local content source device. That is, in some embodiments, the local content source device, upon receiving the request for new content determines whether the buffered content should be retained or removed. In yet another embodiment, the determination as to whether to remove content may be made at the display device.

In one embodiment, the buffered content is always written into the extra storage. In yet another embodiment, the storage 140 and the extra storage are used to enable double buffering. That is, the display 130 will alternate between reading from the storage 140 and the extra storage, while the communication device will receive new content and will alternate between writing to the one of the two storage locations that does not contain the content currently being read by the display device. In this manner, content can be transmitted and buffered at the display to enable a more real time experience for the user.

Referring back to step 520, if it is determined that the second content is not the same as the buffered content, a request is sent to the content source device for the second content in step 540. Next in step 550 the display device receives the second content from the content source device. As described above the second content may comprise new content, or modified content. For example, in one embodiment, the second content may comprise a next page in a book, the same page of the book displaying notes made by a user, the same page having a bookmark image or representation, etc.

Next, in step 560, in response to receiving the second content, the display device displays the second content. In one embodiment, in response to displaying the content in step 540, the first content is removed from the display device. In some embodiments, the first content is removed as a result of displaying the second content. In some embodiments, the first content may be removed in response to receiving the content.

Figure 6:
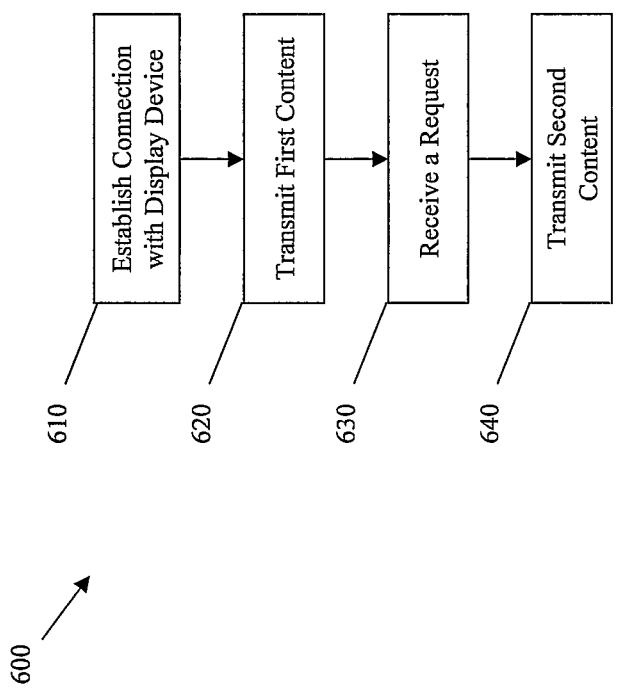
FIG. 6 illustrates an exemplary process 600 performed by the local content source device for providing content to the display device, according to one embodiment of the present invention.

Referring next to FIG. 6, an exemplary process 600 performed by the local content source device for providing content to the display device is illustrated, according to one embodiment of the present invention. First, in step 610, a connection is established between the local content source device and the display device. In one embodiment, the connection is established upon the display device being turned on. In such embodiment, for example, once the user enters the proper user input through the user input means provided at the display device, the device is turned on and attempts to establish a connection with the local content source device. In another embodiment, upon being turned on the user is asked to enter a command, such as a pin, the identification information for the local content source device it wishes to connect with, etc., or to verify the local content source device, before the connection is established. In yet another embodiment, the connection in step 610 is established at the local content source device where the user enters a request for establishing a connection between the display device and the local content source device. In such embodiments, similar information such as identification information, pin, etc. may be required before a connection is established. In some embodiments, as a result of establishing a connection in step 610, a communication channel may be established between the display device and the local content source device.

In one embodiment, the communication channel enables a two-way communication between the local content source device 200 and the display device 100, such that the display device is able to send and receive messages from the local content source device through the communication device.

Next, in step 620, the local content source device transmits the first content to the display device 100. In one embodiment, before transmitting the first content, the display device 100 sends a request to the local content source device 200 via the communication channel and the local content source device transmits the first content to the display device in response to receiving the request. In another embodiment, upon establishing the communication channel the local content source device automatically sends the content to the display device. In one embodiment, the user may enter a request before the first content is forwarded to the display device. In such embodiments, the user request may be entered at the display device and forwarded to the local content source device or may be entered at the local content source device. In one embodiment, the first content corresponds to a single frame. That is, in some embodiments, the display device only receives as much content as it can display.

Next, in step 630, the local content source device receives a request for a second content. In one embodiment, the user request in entered using the user input means at the display device and the display device transmits the request to the local content source device. For example, in one embodiment, the user may enter the request using one or more buttons placed on the housing of the display device. In another embodiment, the display device may be equipped with touch screen technology, and the user may enter a request by using the touch screen.

In another embodiment, the user enters a request at the local content source device, and the local content source device transmits new content to the display device in response to the user request. In one embodiment, for example, the user enters a request using the user input means at the local content source device 200. In one or more embodiments, in response to the request the local content source device sends new content to the display device. In yet another embodiment, the request may be received from another external source, such as for example a remote device, or a remote site. For example, in one embodiment, a user may enter a request via a remote control device and the local content source device will receive the request from the remote control through a communication link.

In one embodiment, the user request is for new content. For example, in one embodiment, where the content comprises a book, the user may enter a request to move to the next page of the book, jump to the previous page, or jump to another location within the book, e.g. a specific page number. In another embodiment, the user request may comprise a request to modify content, or mark content. For example, in one embodiment, the user may request to bookmark the content being displayed at the display device for later retrieval, or for future reference. In another embodiment, the user may be able to enter notes at the display device and/or the local content source device about the image or content. In yet another embodiment, the user may request to modify the image, for example zoom in or zoom out, crop the image, etc.

Next, in step 640, the local content source device transmits the second content corresponding to the request to the display device 100.

Figure 7:
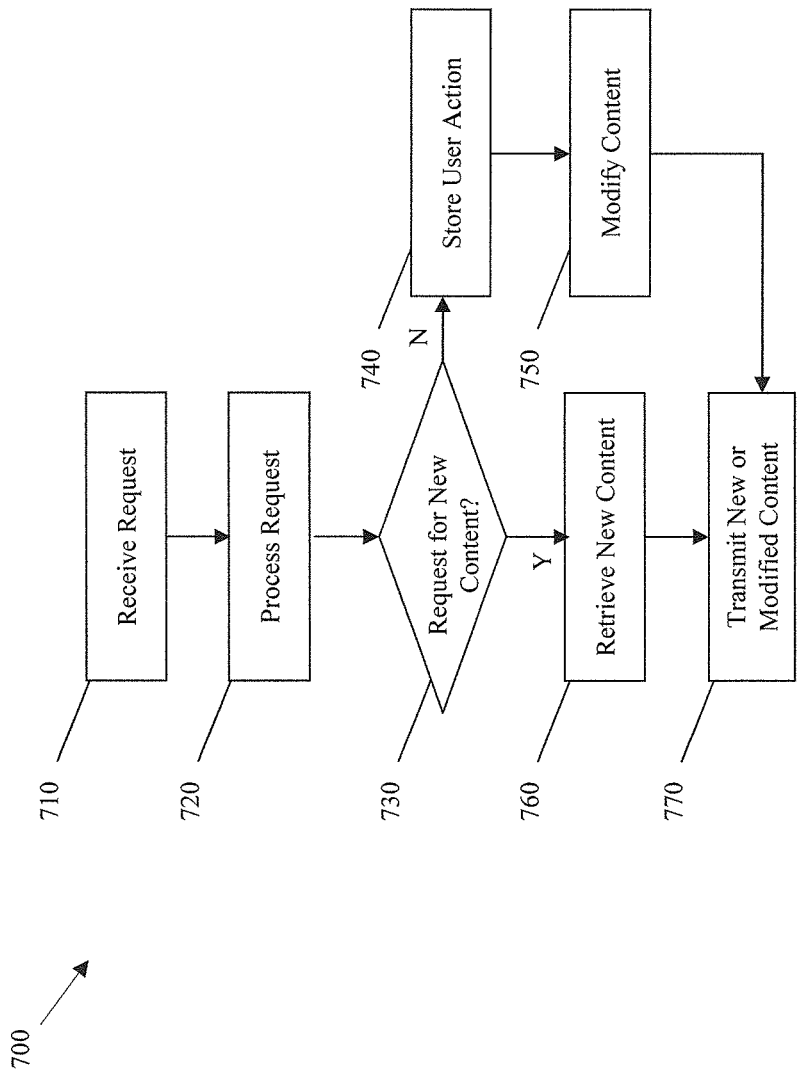
FIG. 7 illustrates an exemplary process 700 of transmitting content from the local content source device, according to one embodiment of the present invention.

Referring next to FIG. 7, an exemplary process 700 of transmitting content from the local content source device is illustrated, according to one embodiment of the present invention. The process begins in step 710 when the local content source device receives a request for new content. In some embodiments, the request may be received through a wired or wireless communication link or may be entered at the device using user input means such as a keypad, keyboard, mouse, or touch screen technology. In one embodiment, the request may be received from the display device. For example, the display device may transmit a message received by the user input means at the display device through the communication link established between the display device and the local content source device. In another embodiment, the user may enter the request for content at the local content source device using a keypad, keyboard, or other user input device. In yet another embodiment, the request may be received from another external source, such as for example a remote device, or a remote site. For example, in one embodiment, a user may enter a request via a remote control device and the local content source device will receive the request from the remote control through a communication link.

Upon receiving the request, the process moves to step 720 where the local content source device determines the nature of the request and processes the request. That is, in step 720 the local content source device determines what is being requested. In one embodiment, for example, the system enables the user to request new content, or to edit existing content. In another embodiment, the user may also be able to enter a search query and the local content source device will process the request to retrieve the content the user is searching for. In other embodiments, the user may be able to enter other queries, such as for example, an address for retrieving a map or directions, etc.

In step 730, after processing the request, the local content source device determines whether the request is for new content, or for editing content. If it is determined that the request is for new content, the process moves to step 760 and the new content is retrieved. In one embodiment, the content is locally stored in the memory at the local content source device, and the local content source device retrieves the content from memory. In another embodiment, the content may not be available at the local content source device, and the local content source device may retrieve the content from a remote source. For example, in some embodiments, the local content source device may retrieve the content from a remote database, from a remote device, or from the internet. In one embodiment, the local content source device may retrieve the content from several different sources. In some embodiments, the local content source device may have the source of the content stored and may use the stored information to retrieve the content. In additional or alternative embodiments, the local content source device may send out a query to one or more sources to locate the requested content.

If on the other hand, in step 730 it is determined that the request is not for new content, and instead the user is requesting a modification to existing content, such as content being currently displayed at the display device, the process continues to step 740. In step 740, the requested action such as editing, notes, bookmarks, etc. is stored at the local content source device, and in step 750, the device applies the modifications to the existing content. In one or more embodiments, the local content source device keeps track of the content being currently displayed such that upon determining that the request is for editing or modifying content, it will retrieve the existing content and make the modifications. In another embodiment, the request may include an identification of the existing content being modified. In yet another embodiment, the local content source device may maintain a log of its communication with the display device, and may consult this communication log to determine the content being currently displayed at the display device.

After the new content has been retrieved, in step 760, or the content has been modified according to the request, in step 750, in step 770, the local content source device transmits the new content or modified content to the display device 100 where the new or modified content is displayed.

Figure 8:
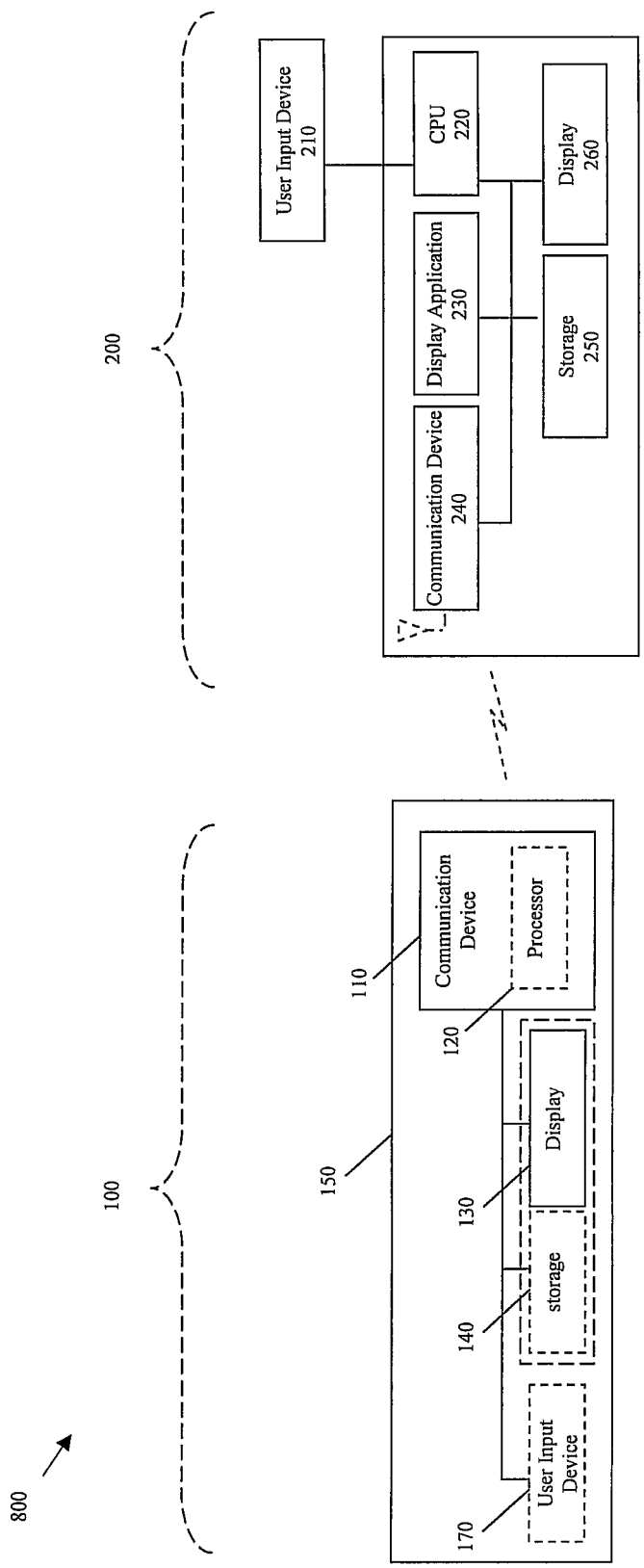
FIG. 8 illustrates an overall diagram of a display system 800 according to one embodiment of the present invention.

FIG. 8 illustrates an overall diagram of a display system 800 according to the one embodiment of the present invention. As illustrated the system 800 comprises the display device 100 as illustrated for example in FIGS. 1*a* and 1*b* and the content source device 200 illustrated for example in FIG. 2.

The content source device 200 is configured to have a display application 230 thereon which comprises means for transmitting the content retrieved to be displayed at the local display 260 of the content source device 200 and to transmit the content to the display device 100 to be displayed by the display device 100 at the display 130. That is, the system effectively provides an extension display device for viewing the content stored and/or retrieved and displayed at the content source device 200.

In one or more embodiments, the display device 100 is further configured to receive a user input and to transmit the user input to the content source device via communication device 110 at the display device, wherein the display application at the content source device is configured to receive the user input through the communication device 240. In one embodiment, the display application is further configured to receive the input and to process the input in order to provide new data to the display device 100. For example, in one embodiment, the display application 230 may determine that the user input is a request for new content, and will retrieve the content from local or remote storage, and or from one or more remote devices and/or servers. In another embodiment, the user input may correspond to a request to edit the content being currently displayed. In one embodiment, upon determining a request to edit the content, the display application is configured to edit the content or send a request for editing the content. In one or more embodiments, the display application is further configure to transmit the new content to the display device 100 where it is displayed in lieu of the content being currently displayed.

In some embodiment, the display application is essentially configured to augment the content source device such that upon a communication being established between the display device 100 and the content source device 200, the display device functions as an extended display device which display content stored and or retrieved by the content source device 200, which would otherwise be displayed at the local display 260 of the content source device. In one embodiment, the content is simultaneously displayed at both the content source display 260 and the display 130. In other embodiments, the display application 230 may run in the back of other applications using the display 260 of the content source device such that content is only transmitted to the display device 100 and displayed at the display 130.

In one or more embodiments, the display device 100 has not local control functionality other than capability to receive input and transmit the input to the content source device and further to receive content and display the content. That is, the entire process is carried out at the content source device 200 having the display application 230. Furthermore, the display device does not contain any permanent storage means for retaining content and at any given time the only content at the display device 100 comprises the content being transmitted from the content source device and displayed at the display 130. In one embodiment, upon receiving content the content being currently displayed at the display device 100 is overwritten. In other embodiments, where the communication bandwidth is limited, e.g. Bluetooth communication, the display device 100 may comprise a buffer for buffering the content being received from the content source device while the current content is being displayed and will overwrite the content once the entire content has been received, and or upon the user entering an input command to replace the content.

In some embodiments, one or more of the embodiments, methods, approaches, and/or techniques described above may be implemented in a computer program executable by a processor-based system. Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, and/or techniques described herein.

While the invention herein disclosed has been described by means of specific embodiments, examples and applications thereof, numerous modifications and variations could be made thereto by those skilled in the art without departing from the scope of the invention set forth in the claims.

What is claimed is:

1. A local content source device, comprising:
   a housing configured to be hand-held;
   communication means within the housing configured to establish a communication channel with a local display device external to the housing;
   a display screen integrated with the housing and configured to display books;
   a processor; and
   a computer readable medium coupled to the processor, storing application machine code, wherein the processor is configured to execute the application machine code to:
   establish the communication channel with the local display device wherein the communication channel is configured to transmit content to the local display device, and wherein each transmittal contains content corresponding to a single static screen image;
   transmit a first single static screen image corresponding to a content to the local display device; and
   transmit a second single static screen image corresponding to the content to the local display device only in response to receiving a request from the local display device;
   wherein the content corresponds to a book and the first and second single static screen images correspond to pages of the book.

2. The local content source device of claim 1, wherein one or both the first single static screen image and the second single static screen image are retrieved through the communication means from a remote location.

3. The local content source device of claim 1, wherein the one or both the first single static screen image and the second single static screen image is stored locally at the local content source device.

4. The local content source device of claim 1, wherein the communication means is a wireless communication means.

5. The local content source device of claim 1, wherein the communication means comprises a Bluetooth connection.

6. The local content source device of claim 1, wherein the communication means comprises a LAN connection.

7. The local content source device of claim 1, wherein the communication means is a wired communication means.

8. The local content source device of claim 1, further comprising:
   global positioning means configured to determine a position of the local display device.

9. The local content source device of claim 1, further comprising, user input means configured to allow a user to enter a user request for the content.

10. The local content source device of claim 1, wherein the request is received from the local display device through the communication means.

11. The local content source device of claim 1, wherein the request is received from a remote device other than the local display device.

12. A method comprising:
   establishing a communication channel from a local content source device with a local display device, wherein the communication channel enables transmitting content to the local display device, and wherein each transmittal contains content corresponding to a single static image;
   transmitting a first static screen image corresponding to a content to the local display device; and
   transmitting a second single static screen image corresponding to the content to the local display device only in response to the request receiving a request from the local display device;
   wherein the content corresponds to a book and the first and second single static screen images correspond to pages of the book.

13. The method of claim 12, wherein the receiving the request comprises receiving the request from the local display device over the communication channel.

14. The method of claim 12, wherein the receiving the request comprises receiving the request through a user input means.

15. The method of claim 12, further comprising:
   determining a position of the local display device; and
   storing the position.

16. The method of claim 12, further comprising retrieving the first static screen image in response to establishing the communication channel.

17. The method claim 12, further comprising:
   determining that the request is for new static screen image; and
   retrieving the second static screen image corresponding to the request when it is determined that the request is for new content.

18. The method of claim 17, wherein the second static screen image is locally stored at the local content source device and retrieving the second static screen image comprises retrieving the stored second static screen image.

19. The method of claim 17, wherein the second static screen image is not locally stored at the local content source device, and retrieving the second static screen image comprises requesting the second static screen image from a remote source.

20. The local content source device of claim 12, further comprising:
   determining that the request is for modifying the first static screen image; and
   modifying the first static screen image according to the request, such that the second static screen image corresponds to the modified first static screen image.

21. The method of claim 12, further comprising:
   receiving a communication request for establishing the communication channel from the local display device, wherein establishing the communication channel comprises establishing the communication channel in response to receiving the communication request.

* * * * *

UNITED STATES PATENT AN33D TRADEMARK OFFICE
CERTIFICATE OF CORRECTION

PATENT NO.       : 8,665,219 B2                              Page 1 of 1
APPLICATION NO.  : 12/562133
DATED            : March 4, 2014
INVENTOR(S)      : Unger It is certified that error appears in the above-identified patent and that said Letters Patent is hereby corrected as shown below:

In the CLAIMS:
Claim 1, column 15, line 50, delete "processor," and insert --processor--.

Signed and Sealed this
Twenty-ninth Day of July, 2014

Michelle K. Lee
*Deputy Director of the United States Patent and Trademark Office*